US012799364B2

(12) United States Patent
Bushong et al.

(10) Patent No.: US 12,799,364 B2
(45) Date of Patent: Nov. 17, 2026

(54) HIGH REMOVAL RATE CHEMICAL MECHANICAL POLISH FOR OPHTHALMIC POLISHING

(71) Applicant: Pacific Industrial Development Corporation, Ann Arbor, MI (US)

(72) Inventors: Peter Bushong, Livonia, MI (US); David Shepard, Canton, MI (US); Ashwin Sankaran, Arnhem (NL)

(73) Assignee: Pacific Industrial Development Corporation, Ann Arbor, MI (US)

( * ) Notice: Subject to any disclaimer, the term of this patent is extended or adjusted under 35 U.S.C. 154(b) by 255 days.

(21) Appl. No.: 18/845,114

(22) PCT Filed: Apr. 17, 2023

(86) PCT No.: PCT/US2023/018768
§ 371 (c)(1),
(2) Date: Sep. 9, 2024

(87) PCT Pub. No.: WO2023/211707
PCT Pub. Date: Nov. 2, 2023

(65) Prior Publication Data

US 2025/0179332 A1 Jun. 5, 2025

Related U.S. Application Data

(60) Provisional application No. 63/334,719, filed on Apr. 26, 2022.

(51) Int. Cl.
*C09G 1/02* (2006.01)
*B24B 37/02* (2012.01)
(Continued)

(52) U.S. Cl.
CPC ................ *C09G 1/02* (2013.01); *B24B 37/02* (2013.01); *C09K 3/1409* (2013.01); *G02C 7/02* (2013.01)

(58) Field of Classification Search
CPC .. C09G 1/02; C09G 1/04; B24B 37/02; B24B 37/044; C09K 3/1409; C09K 3/1463;
(Continued)

(56) References Cited

U.S. PATENT DOCUMENTS

2004/0115944 A1 6/2004 Matsui
2004/0187393 A1* 9/2004 Mutoh ..................... C09G 1/16 106/3
(Continued)

OTHER PUBLICATIONS

WO 2020/054823 (Mar. 2020).*
(Continued)

*Primary Examiner* — Alexander Markoff
(74) *Attorney, Agent, or Firm* — Dickinson Wright PLLC

(57) ABSTRACT

A formulation that is an aqueous dispersion of abrasive particles and a surfactant configured to polish an external surface of plastic ophthalmic lens is provided along with a method of using such formulation to polish such lens. This formulation has a viscosity of about 1 cP to about 25 cP with a total solids content in the range of about 15 wt. % to about 40 wt. %. The abrasive particles are a mixture of crystallized alpha alumina and theta alumina; wherein the alpha alumina is present in an amount ranging from 50 wt. % to 80 wt. % and the theta alumina is present in an amount ranging from 50 wt. % to 20 wt. % relative to the overall weight of the abrasive particles. The formulation is configured to remove plastic material at a rate of at least 8 mg/min when measured in a conventional lens polisher with an uncut plastic ophthalmic lens.

20 Claims, 4 Drawing Sheets

(51) Int. Cl.
*C09K 3/14* (2006.01)
*G02C 7/02* (2006.01)

(58) Field of Classification Search
CPC .... G02C 7/02; C01P 2004/61; C01P 2006/12; C01F 7/24
See application file for complete search history.

(56) References Cited

U.S. PATENT DOCUMENTS

| | | | | |
|---|---|---|---|---|
| 2007/0044385 | A1* | 3/2007 | Yamada | C08G 18/4837 51/307 |
| 2012/0034851 | A1 | 2/2012 | Song | |
| 2022/0025212 | A1* | 1/2022 | Ishida | C09G 1/02 |

OTHER PUBLICATIONS

WO 2019/167540 (Sep. 2019).*
WO 2016/043088 (Mar. 2016).*
WO 2016/043089 (Mar. 2016).*
WO 2012/120923 (Sep. 2012).*
WO 2012/105322 (Aug. 2012).*
DE 69910170 (Jun. 2004).*
JP 11-268911 (Oct. 1999).*
European Patent Office, Rijswijk, Netherlands, International Search Report of International Application No. PCT/US2023/018768, Mailed Jul. 19, 2023, 3 pages.

* cited by examiner

HIGH REMOVAL RATE CHEMICAL MECHANICAL POLISH FOR OPHTHALMIC POLISHING

CROSS REFERENCE TO RELATED APPLICATIONS

This application is a national stage filing of International Application No. PCT/US2023/018768 filed on Apr. 17, 2023, designating the United States and published in English, which claims the benefit of the filing date under 35 U.S.C. § 119 (e) of U.S. Provisional Application No. 63/334,719 filed on Apr. 26, 2022, the entire contents of which are incorporated herein by reference in their entirety.

FIELD

This invention generally relates to ophthalmic polishing formulations. More specifically, the present disclosure relates to an ophthalmic lens polish formulation that provides an enhanced or high-level removal rate, while maintaining a low viscosity.

BACKGROUND

The statements in this section merely provide background information related to the present disclosure and may not constitute prior art.

When polishing plastic (e.g., polycarbonate) lens, the management of the viscosity exhibited by an ophthalmic lens polish without negatively impacting abrasive performance becomes a significant issue. In a conventional lens polisher, a high viscosity formulation isn't an issue provided the formulation remains flowable enough to pass through the pumps and system at a reasonable rate. Formulations as viscous as 400 centipoise (cP) are able to run, without problems, on a conventional polishing instrument. However, the newer digital polishing instruments are unable to accommodate such viscous formulations and when the viscosity is too high, a negative impact on performance across all metrics is observed. In addition, simple dilution is not capable of reducing viscosity while maintaining abrasive performance. Rather, simple dilution reduces viscosity to the point where the concentrations of abrasive and active components are too low to provide adequate performance.

Another challenge for the development of an ophthalmic lens polish formulation for polishing plastic lenses is finding an appropriate abrasive component. A person skilled in the art understands that most formulations employ the use of alpha-alumina ($\alpha$-$Al_2O_3$) as the abrasive grain. However, as alumina sinters to form the alpha phase, it gains hardness and even poor alumina abrasive grains can become hard enough to scratch the relatively soft surface of plastic lenses

SUMMARY

This disclosure generally provides a formulation that comprises an aqueous dispersion of abrasive particles and a surfactant configured to polish an external surface of a plastic ophthalmic lens. This polishing formulation may have a viscosity of about 1 cP to about 25 cP with a total solids content in the range of about 15 wt. % to about 40 wt. %. The abrasive particles comprise a mixture of crystallized alpha alumina and theta alumina; the alpha alumina being present in an amount ranging from 50 wt. % to 80 wt. % and the theta alumina being present in an amount ranging from 50 wt. % to 20 wt. % relative to the overall weight of the abrasive particles. When desirable, the formulation may further comprise one or more of a water dispersible Boehmite, a defoamer, aluminum nitrate, and a rinsing aid.

According to one aspect of the present disclosure, the abrasive particles have a surface area in the range of about 10 $m^2/g$ to about 35 $m^2/g$. The abrasive particles may also have an average particle size ($D_{50}$) in the range of about 1 micrometer (μm) to about 5 μm.

The abrasive particles may be present in a concentration ranging from about 15 wt. % to about 30 wt. % relative to the overall weight of the formulation. The amount of alpha alumina may range from about 60 wt. % to about 70 wt. % and the amount of theta alumina ranges from about 40 wt. % to about 30 wt. % relative to the overall weight of the abrasive particles. When desirable, the abrasive particles may further comprise <1 wt. % of a gamma-phase alumina or delta-phase alumina.

According to another aspect of the present disclosure, the formulation may have a pH that is between about 3 to about 5 and a viscosity that is in the range from about 1 cP to about 10 cP. The surfactant present in the formulation may comprise a carboxy-functionalized or carboxylated polymer or a copolymer thereof.

In addition, the Boehmite may have an average particle size ($D_{50}$) that is less than about 0.5 μm and is present in an amount up to 10 wt. % relative to the overall weight of the formulation. The defoamer may be a water-soluble silica based defoamer that is present in a concentration that ranges up to 1 wt. % relative to the overall weight of the formulation.

According to yet another aspect of the present disclosure, the formulation provides a removal rate of at least 8 mg/min when measured in a conventional lens polisher with an uncut plastic ophthalmic lens. This plastic ophthalmic lens may comprise polycarbonate.

According to another aspect of the present disclosure, a method of polishing an external surface of a plastic ophthalmic lens is provided. This plastic ophthalmic lens may comprise polycarbonate. This method generally comprises the steps of:

(a) providing a plurality of abrasive particles comprising a mixture of crystallized alpha alumina and theta alumina having an average particle size ($D_{50}$) in the range of about 1 micrometer (μm) to about 5 μm; the alpha alumina being present in an amount ranging from 50 wt. % to 80 wt. % and the theta alumina being present in an amount ranging from 50 wt. % to 20 wt. % relative to the overall weight of the abrasive particles;

(b) preparing a formulation comprising an aqueous dispersion of the abrasive particles and a surfactant; wherein the polishing formulation has a viscosity of about 1 cP to about 25 cP with a total solids content in the range of about 15 wt. % to about 40 wt. %;

(c) applying the formulation to the external surface of the plastic ophthalmic lens;

(d) mechanically rubbing the formulation across the external surface of the plastic ophthalmic lens to remove a layer of plastic material from the external surface; and (e) removing the formulation from the external surface to obtain a polished surface.

In this method the abrasive particles may be present in the formulation at a concentration ranging from about 15 wt. % to about 30 wt. % relative to the overall weight of the formulation, wherein the formulation is configured to remove plastic material at a rate of at least 8 mg/min when measured in a conventional lens polisher with an uncut polycarbonate ophthalmic lens. The mechanical rubbing of the formulation across the external surface of the plastic ophthalmic lens may be accomplished through the use of conventional mechanical or manual polishing equipment, a digital polisher, or polishing by hand.

According to another aspect of the present disclosure, in this method the step of providing a plurality of abrasive particles further comprises the steps of:

(a) preparing an aqueous mixture comprising 5 wt. % to 30 wt. % uncrystallized Boehmite and 0.5 wt. % to 4 wt. % nitric acid relative to the overall weight of the mixture;
(b) placing the aqueous mixture into a sealed reaction vessel;
(c) heating the sealed reaction vessel to a temperature ranging from 120° C. to 200° C. for a period of 4 hours to 24 hours to form a slurry;
(d) collecting and drying the slurry to obtain a powder; and
(e) calcining the powder at a temperature ranging from 1,000° C. to 1,200° C. for a period of about 1 hour to about 20 hours to form the mixture of crystallized alpha alumina and theta alumina.

When desirable, the mixture of crystallized alpha alumina and theta alumina may be further subjected to particle size reduction using a milling operation. The abrasive particles may further comprise <1 wt. % of a gamma phase alumina or delta phase alumina. The amount of alpha alumina ranges from about 60 wt. % to about 70 wt. % and the amount of theta alumina ranges from about 40 wt. % to about 30 wt. % relative to the overall weight of the abrasive particles. The formulation may further comprise one or more of a water dispersible Boehmite, a defoamer, aluminum nitrate, and a rinsing aid. When present, the Boehmite has an average particle size ($D_{50}$) that is less than about 0.5 μm and is present in an amount up to 10 wt. % relative to the overall weight of the formulation. When present, the defoamer is a water-soluble silica-based defoamer present in a concentration that ranges up to 1 wt. % relative to the overall weight of the formulation.

Further areas of applicability will become apparent from the description provided herein. It should be understood that the description and specific examples are intended for purposes of illustration only and are not intended to limit the scope of the present disclosure.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

The drawings described herein are for illustration purposes only and are not intended to limit the scope of the present disclosure in any way. It should be understood that throughout the description and drawings, corresponding reference numerals indicate like or corresponding parts and features.

DETAILED DESCRIPTION

Figure 1:
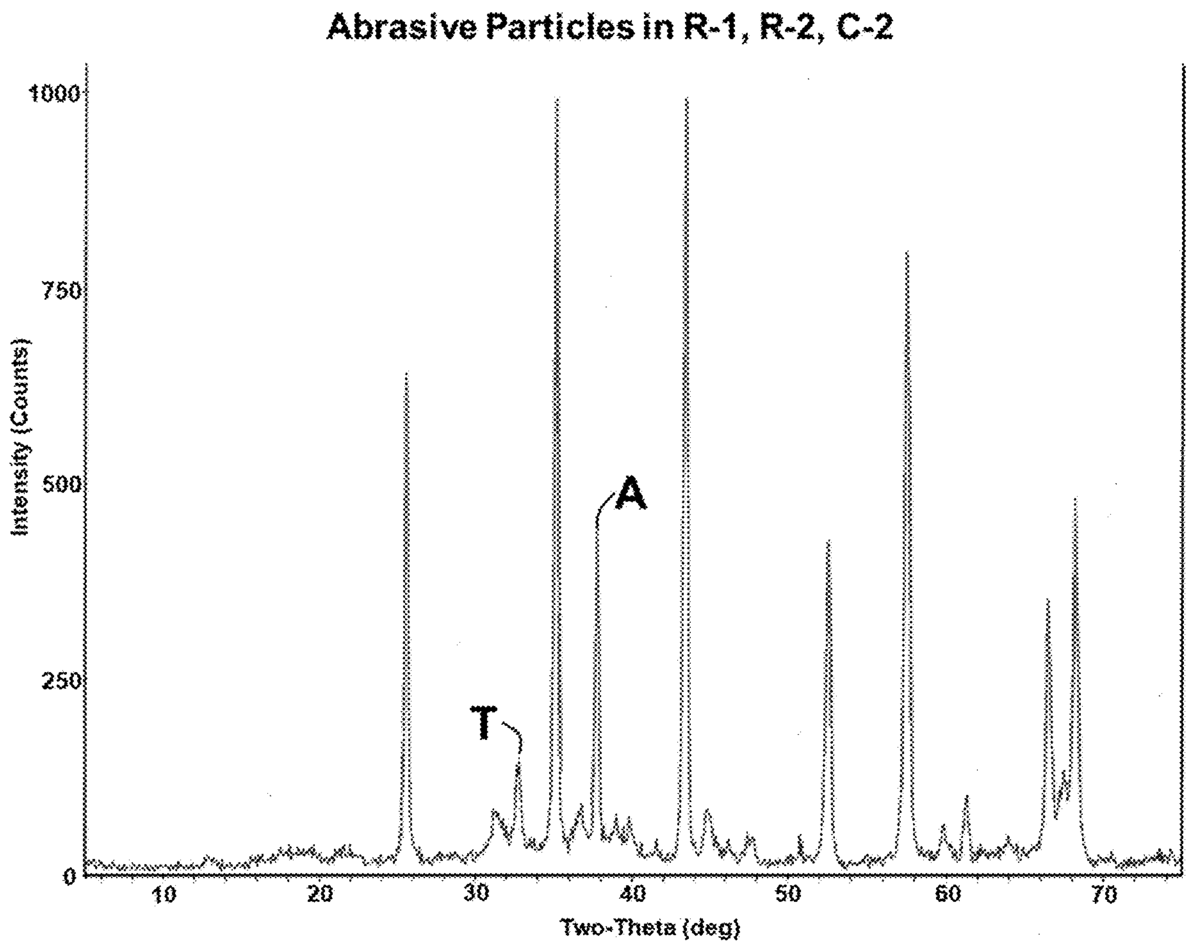
FIG. 1 is a graphical representation of the x-ray diffraction (XRD) pattern measured for the abrasive particles used in the formulation of Experimental Examples (R-1, R-2) and Comparative Example (C-2) prepared according to the teachings of the present disclosure.

The following description is merely exemplary in nature and is in no way intended to limit the present disclosure or its application or uses. The present disclosure generally provides an ophthalmic lens polishing formulation that exhibits an improved removal rate while maintaining a low viscosity. This polishing formulation generally comprises a water-soluble, carboxy-functional copolymer and a mixture of crystallized alpha alumina and a transition-phase alumina.

For the purpose of this disclosure, the terms "about" and "substantially" as used herein with respect to measurable values and ranges refer to the expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one surfactant", "one or more surfactants", and "surfactant(s)" may be used interchangeably and are intended to have the same meaning.

According to one aspect of the present disclosure, an objective was to determine an additive that could lower the viscosity of a polishing formulation without giving rise to a negative impact on performance, e.g., either surface quality or removal rate. This objective was accomplished by incorporating one or more surfactants configured to interact with the abrasive particles and to lower the viscosity of the polishing formulation. The type of surfactant was surprisingly found to dramatically affect the performance of the formulation. The surfactant type capable of providing a low viscosity with negligible impact on the abrasive performance of the polishing formulation is a carboxy-functionalized or carboxylated polymer or copolymer, such as, without limitation, a short alkyl chain polyethylene glycol ether carboxylate, a carboxylic acid triblock surfactant, carboxymethyl cellulose, and a polycarboxylate. An example of a commercially available surfactant of this type includes, but is not limited to, Carbosperse® K-XP228 (Lubrizol Corp., Westlake, Ohio). The surfactant(s) may be present in an amount that ranges from 0.1 wt. % to 5 wt. %; alternatively, from about 0.5 wt. % to about 3 wt. %; alternatively, from about 1 wt. % to about 2 wt. % relative to the overall weight of the polishing formulation. More than one carboxy-functionalized or carboxylated polymeric or copolymeric surfactant or dispersant may be utilized in combination as a blend or as a mixture without exceeding the scope of the present disclosure.

The viscosity of a polishing formulation suitable for use in polishing a plastic lens is less than 30 centipoise (cP) and greater than 0.5 cP; alternatively, within the range of about 1 cP to about 25 cP; alternatively, about 1 cP to about 10 cP. The viscosity of the formulation may be determined by any method known in the art including, but not limited to, the use of a rotational rheometer with a parallel plate geometry, a cone and plate geometry, a coquette cell geometry, d a spindle (e.g., Brookfield viscometer); a viscosity cup; or a vibrational viscometer.

According to another aspect of the present disclosure, another objective was to determine an appropriate abrasive component for use in the polishing formulation that overcame the deficiencies of the existing art. Surprisingly, an alumina comprising a mixture of structural or transitional phases was found to provide higher performance than pure alpha alumina over comparable surface areas and phases. As previously discussed, as full alpha alumina grains increase in hardness upon calcination, they have a tendency to scratch the surface of plastic lens. However, a more gently calcined alumina grain that has both characteristics of alpha and theta phases provides an ideal hardness for polishing a plastic lens. The various alumina phases can be quantitatively measured via x-ray diffraction (XRD). The combination of alpha and theta phases provides an abrasive medium that is soft enough to make scratching of the plastic lens difficult and hard enough to provide adequate abrasion to polish the surface of the lens.

Within the confines of the present disclosure, the term alpha/theta phase alumina is intended to mean a mixture of aluminum oxide particles, wherein a portion of the particles are present as an alpha ($\alpha$) phase and a portion of the particles are present as a theta ($\theta$) phase. The $\alpha$-alumina particles generally exhibit high density (i.e., 3.98 g/cm$^3$) and consist essentially of single crystals. On the other hand, $\theta$-alumina particles generally exhibit lower density (e.g., <3.98 g/cm$^3$) with a low degree of crystallinity.

When aluminum oxide ($Al_2O_3$), i.e., alumina, is obtained by the thermal dehydration of an aluminum hydroxide, such as Gibbsite $Al(OH)_3$ or Boehmite AlO(OH), various structural or transitional phases are formed as the temperature increases. For example, when Boehmite is utilized as the starting material, the alumina structural phases encountered generally follow the sequence $\gamma$-alumina (gamma)→$\Delta$-alumina (delta)→$\theta$-alumina (theta)→$\alpha$-alumina (alpha). Boehmite transforms into $\gamma$-$Al_2O_3$ transition alumina in a temperature range of 500-550° C. with the removal of structural water. The transformation of $\theta$-$Al_2O_3$ to $\alpha$-$Al_2O_3$ generally occurs with prolonged exposure to a temperature above 1050° C.

The abrasive component in the polishing formulation of the present disclosure general includes an alpha/theta phase alumina that comprises, consists of, or consists essentially of a mixture of 50 to 80 wt. % $\alpha$-alumina and 50 to 20 wt. % $\theta$-alumina. Alternatively, the amount of $\alpha$-$Al_2O_3$ present in the abrasive component of the polishing formulation ranges from about 55 to about 75 wt. % with the amount of $\theta$-$Al_2O_3$ present ranging from about 45 to about 25 wt. %. Alternatively, the amount of $\alpha$-$Al_2O_3$ present in the abrasive component of the polishing formulation ranges from about 60 to about 70 wt. % with the amount of $\theta$-$Al_2O_3$ present ranging from about 40 to about 30 wt. %. Alternatively, the amount of alpha/theta phase alumina present in the abrasive component of the polishing formulation is provided by a ratio of $\alpha$-$Al_2O_3$ to $\theta$-$Al_2O_3$ that is within the range from 1:1 to 4:1; alternatively, in the range from about 1.25:1 to about 3:1; alternatively, in the range from about 1.5:1 to about 2.25:1. The amount of other alumina phases, such as $\gamma$-alumina or $\Delta$-alumina, in the abrasive component is negligible; alternatively, the present of any other alumina phases is ≤0.5 wt. %; alternatively, ≤1.0 wt. % relative to the weight of the abrasive component.

Figure 2:
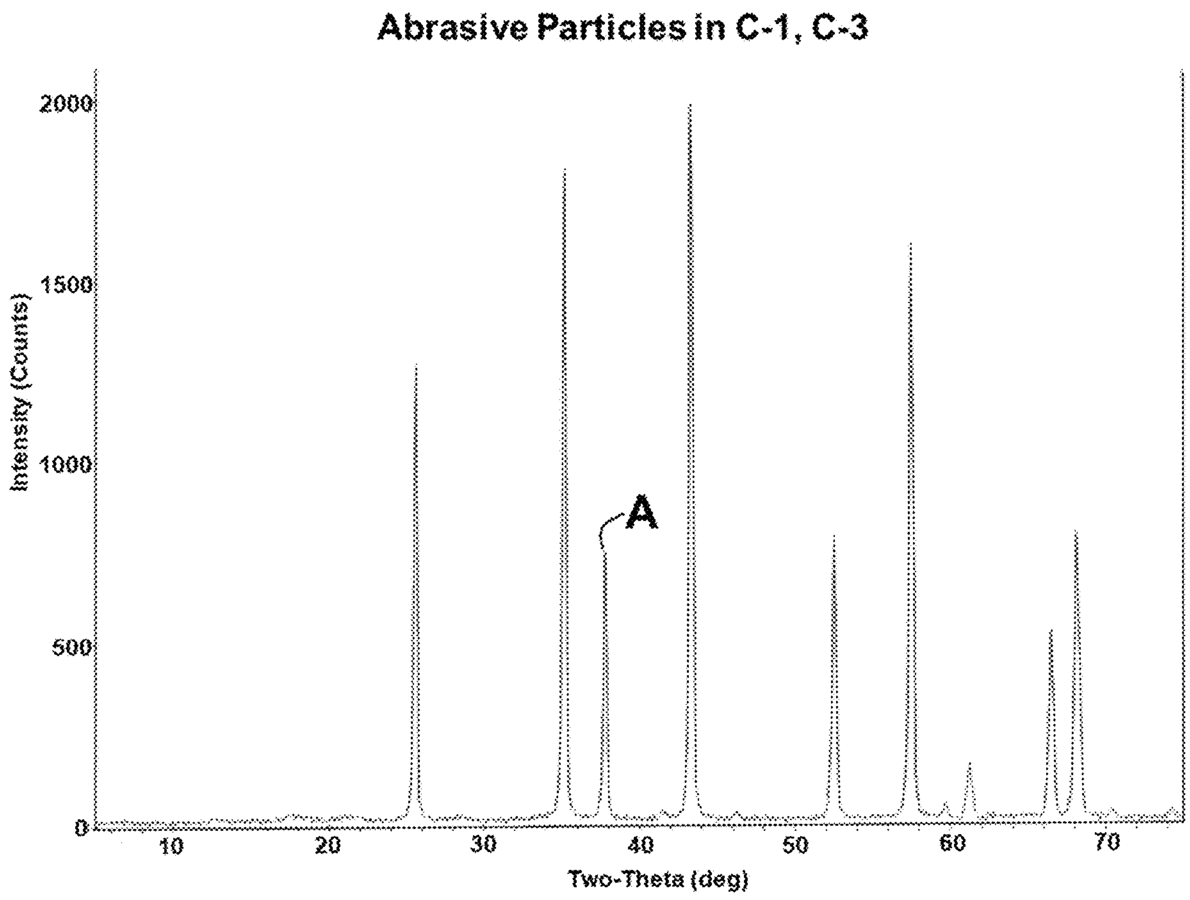
FIG. 2 is a graphical representation of the XRD pattern measured for the abrasive particles used in the formulation of Comparative Examples (C-1, C-2).

The amount of each phase present in the alpha/theta phase alumina that comprises the abrasive particles may be quantitatively determined using x-ray diffraction (XRD) measurement. Quantitative phase analysis represents the measure of relative proportion of elemental constituents or phases using X-ray diffraction (XRD) patterns with calibration to either internal or external standards. The intensity of the diffraction lines for a particular phase in a mixture depends on the relative amount of that phase in the mixture. Referring to FIGS. 1 and 2, the determination of the phase ratio between alpha and theta phases is accomplished by measuring the ratio of the intensities between the peak measured at ~33 degrees attributed to $\theta$-$Al_2O_3$ (see point T in FIG. 1) and the peak measured at ~38 degrees attributed to $\alpha$-$Al_2O_3$ (see point A in FIGS. 1 & 2). As shown in FIG. 1, the abrasive particles used in the polishing formulations of Experimental Examples R-1 and R-2, as well as Comparative Example C-2 are shown to comprise a mixture of both alpha alumina and theta alumina phases. In comparison, as shown in FIG. 2, the abrasive particles used in the polishing formulations of Comparative Examples C-1 and C-2 contain only an alpha alumina phase.

The abrasive particles exhibit an average particle size ($D_{50}$) that ranges from 0.5 micrometers (μm) to 7.5 μm; alternatively, from about 1 μm to about 5 μm; alternatively, from about 1.5 μm to about 3 μm. The average particle size and particle size distributions may be measured using any conventional technique, such as sieving, microscopy, Coulter counting, dynamic light scattering, or particle imaging analysis, to name a few. Alternatively, a laser particle analyzer is used for the determination of average particle size and its corresponding particle size distribution.

The abrasive particles also exhibit a surface area that ranges from 5 m$^2$/g to 40 m$^2$/g; alternatively, from about 10 m$^2$/g to about 35 m$^2$/g; alternatively, from about 15 m$^2$/g to about 30 m$^2$/g. The measurement of surface area for the abrasive particles may be accomplished using any known technique, including without limitation, microscopy, small angle x-ray scattering, mercury porosimetry, and Brunauer, Emmett, and Teller (BET) analysis. Alternatively, the surface area is determined using Brunauer, Emmett, and Teller (BET) analysis.

When desirable the polishing formulation may incorporate one or more of a water dispersible Boehmite, a defoamer, aluminum nitrate, and a rinsing aid. The amount of the Boehmite incorporated into the polishing formulation may range from greater than 0 wt. % up to 12 wt. %; alternatively, up to 10 wt. %; alternatively, less than or equal to 5 wt. %. The Boehmite particles may exhibit an average particle size that is less than 0.75 μm; alternatively, about 0.5 μm or less; alternatively, no higher than 0.25 μm.

The optional defoamer in the polishing formulation may comprise, without limitation, a water-soluble silica-based defoamer present in a concentration that ranges from greater than 0 wt. % up to 1.5 wt. %; alternatively, no greater than 1 wt. %. The optional rinse aid incorporated into the formulation may include any commercially available or known rinse aid, including, but not limited to, polyvinylpyrrolidone (PVP).

The resulting polishing formulation comprises an aqueous dispersion of the abrasive particles and a surfactant as described above that was found to effectively be capable of polishing an external surface of a plastic ophthalmic lens. This polishing formulation contains an overall solids content of 10 wt. % to 50 wt. %; alternatively, about 15 wt. % to about 40 wt. %; alternatively, the overall solids content ranges from about 20 wt. % to about 35 wt. %. The amount of the abrasive particles present in the polishing formulation ranges from 10 wt. % to 35 wt. %; alternatively, from about 15 wt. % to about 30 wt. %; alternatively, from about 20 wt. % to about 30 wt. %.

Generally, the pH of the polishing formulation is acidic in nature, i.e., with a pH<7; alternatively, with a pH ranging from about 3 to 5; alternatively, with a pH ranging from about 3 to about 4.

The plastic lens whose surface is polished by the formulation may be any standard plastic poly(allyl diglycol carbonate) lens (e.g., CR-39), a polycarbonate lens, a Tribrid lens, a Trivex lens, a high or ultra-high index plastic lens used for an ophthalmic application. Alternatively, the plastic lens is a polycarbonate lens.

Figure 3:
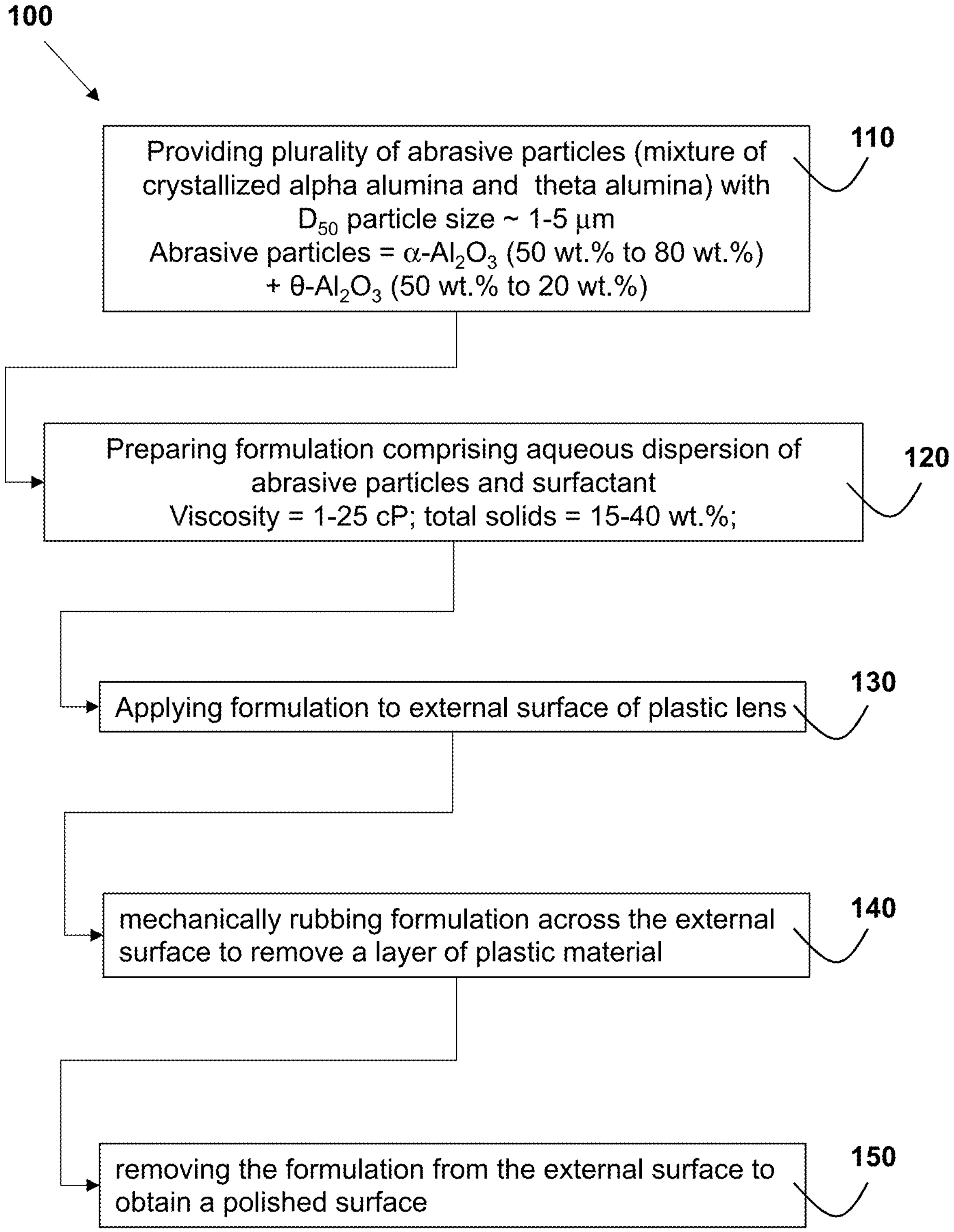
FIG. 3 is a flowchart of a method for polishing an external surface of a plastic ophthalmic lens according to the teachings of the present disclosure.

According to yet another aspect of the present disclosure, a method of polishing an external surface of a plastic ophthalmic lens is provided. Referring now to FIG. 3, this method 100 generally comprises the following steps. First, a plurality of abrasive particles comprising, consisting of, or consisting essentially of a mixture of crystallized alpha alumina and theta alumina having an average particle size ($D_{50}$) in the range of about 1 micrometer (μm) to about 5 μm is provided 110. The alpha alumina is present in an amount ranging from 50 wt. % to 80 wt. % with the theta alumina being present in an amount ranging from 50 wt. % to 20 wt. % relative to the overall weight of the abrasive particles. A polishing formulation is prepared 120 as previously defined above and as further described herein. This formulation generally comprises an aqueous dispersion of these abrasive particles and a surfactant. This polishing formulation has a viscosity of about 1 cP to about 25 cP with a total solids content in the range of about 15 wt. % to about 40 wt. %. The formulation is applied 130 to the external surface of the plastic ophthalmic lens and then mechanically rubbed 140 across the external surface of the plastic ophthalmic lens to remove a layer of plastic material from the external surface. Finally, the formulation is removed 150 from the external surface to obtain a polished surface.

As used herein the phrase "to polish" or term "polishing" refers to making the surface of the ophthalmic lens smoother by the removal of material to eliminate the appearance of scratches and the haze created thereby. In other words, the smoothing of the surface of the ophthalmic lenses assists in hiding or eliminating the appearance of surface imperfections and reduces the magnitude of any diffuse reflection.

Figure 4:
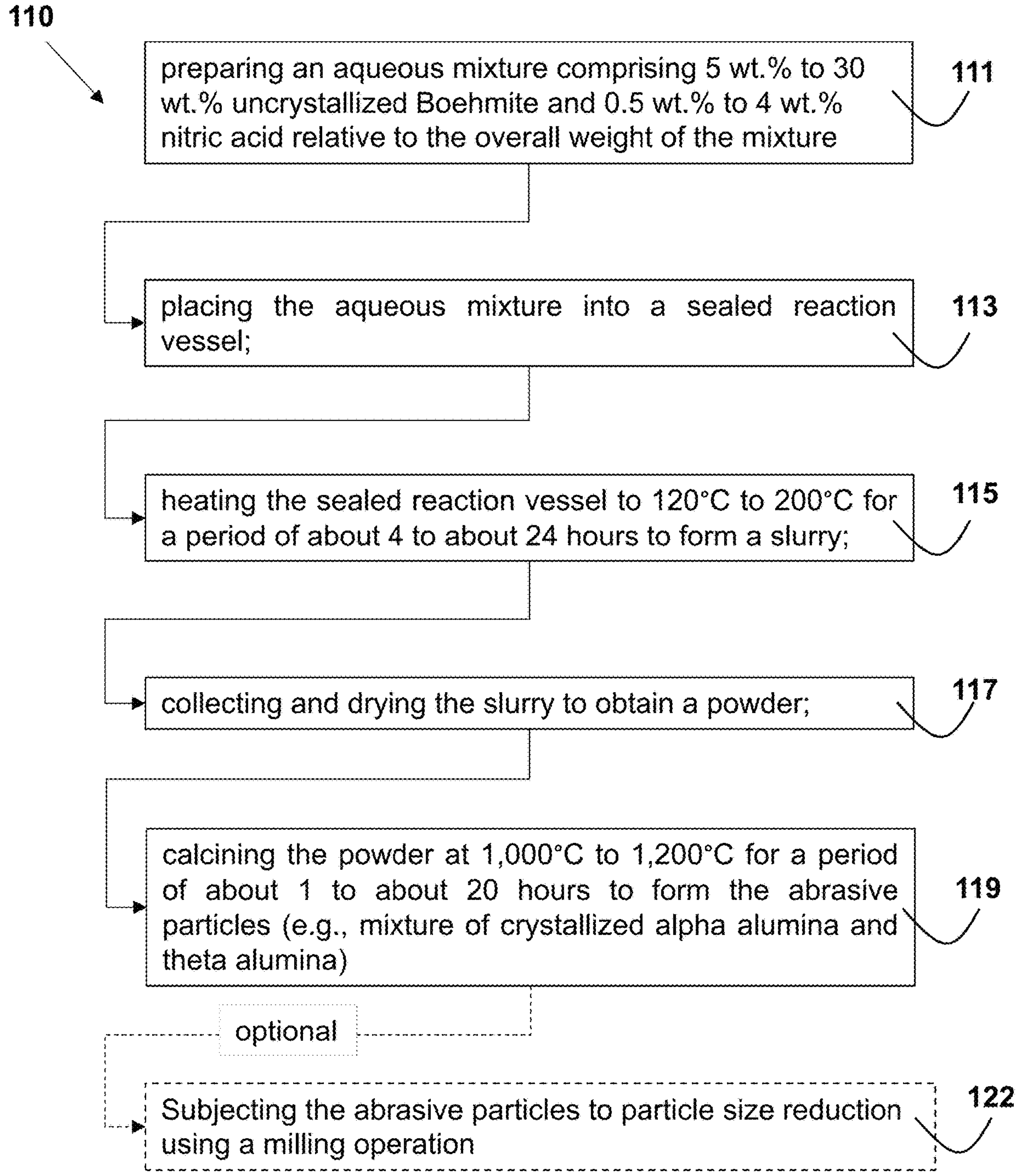
FIG. 4 is a flowchart of a method for preparing the abrasive particles used in the method depicted in FIG. 3.

The mechanical rubbing 140 or polishing of the external surface described in FIG. 3 may be accomplished by any polishing method known to be used with ophthalmic lens. Several examples, of such polishing methods, include, without limitation, conventional mechanical or manual polishers or polishing equipment, digital polishers, or polishing by hand. The average amount of plastic material removed from the surface of the lens during polishing in order to effectively polish the lenses surface ranges from 8 mg/min to about 11 mg/min; alternatively, from about 9 mg/min to about 10 mg/min, while maintaining a low viscosity as previously described Referring now to FIG. 4, the step of providing 110 a plurality of abrasive particles may comprise the following steps. An aqueous mixture may be prepared 111 comprising 5 wt. % to 30 wt. % uncrystallized Boehmite and 0.5 wt. % to 4 wt. % nitric acid relative to the overall weight of the mixture. The aqueous mixture is placed 113 into a sealed reaction vessel and then heated 115 to a temperature ranging from 120° C. to 200° C. for a period of 4 hours to 24 hours to form a slurry. The slurry is collected 117 and dried to obtain a powder. Finally, this powder is calcined 119 at a temperature ranging from 1,000° C. to 1,200° C. for a period of about 1 hour to about 20 hours to form the mixture of crystallized alpha alumina and theta alumina particles. When desirable, the step of providing 110 a plurality of abrasive particles may include subjecting 122 the mixture of crystallized alpha alumina and theta alumina to particle size reduction using a milling operation. Such milling operation may include, but not be limited to, the use of a sand mill, an attritor mill, and a horizontal bead mill.

EXAMPLES

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

All alumina used in the polishing formulations prepared according to the teachings of the present disclosure, as well as those used as comparative examples were found to exhibit an average particle size ($D_{50}$) in the range of about 1.5 micrometers (μm) to about 3 μm. Abrasive particles having this average particle size ($D_{50}$) was obtained by milling the alumina in a horizontal bead mill at 40% oxide in water by volume at 2000 rpm for approximately 2 hours using 1.25 mm yttria stabilized zirconia milling beads. A measurement of the particle size distribution was taken every 15 to 30 minutes until the measured average particle size ($D_{50}$) was within the stated range.

In the preparation for each of the following polishing formulations the raw materials were combined and mixed until homogeneously dispersed. In each case, the raw materials were mixed together for 30 to 90 minutes at 600 rpm using an overhead mixer equipped with an impeller-type blade.

Preparation of Polishing Formulations According to the Present Disclosure—In the first Experimental Example (R-1), a water-based formulation consisting of 20 wt. % abrasive particles comprising a mixture of crystallized alpha-phase alumina and theta phase alumina, 2 wt. % aluminum nitrate, 2.5 wt. % of a surfactant (KXP-228, Lubrizol Corp., Westlake, Ohio), 0.5 wt. % of a silica-based defoamer, and 2.5 wt. % of a water-dispersible boehmite with the remainder being water was prepared. In this formulation, the alpha/theta phase alumina abrasive particles comprised about 35 wt. % theta-phase alumina and about 65 wt. % alpha-phase alumina (see FIG. 1). These abrasive particles exhibited an average surface are of about 24 $m^2/g$, The pH of this formulation was measured to be 3.5.

In the second experimental Example (R-2), a water-based formulation consisting of 20 wt. % alpha/theta phase alumina abrasive particles, 2 wt. % aluminum nitrate, 2.5 wt. % of a surfactant (KXP-228, Lubrizol Corp., Westlake, Ohio), 0.5 wt. % of a silica-based defoamer, 2.5 wt. % polyvinylpyrrolidone (PVP), and 2.5 wt. % of a water-dispersible boehmite with the remainder being water was prepared. In this formulation, the alpha/theta phase alumina abrasive particles comprised about 35 wt. % theta-phase alumina and about 65 wt. % alpha-phase alumina (see FIG. 1). These abrasive particles exhibited an average surface are of about 24 $m^2/g$, The pH of this formulation was measured to be 3.9. The polyvinylpyrrolidone (PVP) utilized had an average molecular weight of 10,000 gms/mole.

Preparation of Comparable Example Formulations

In Comparative Example C-1, a water-based formulation comprising 25 wt. % uncrystallized alpha alumina abrasive particles, 2 wt. % aluminum nitrate, 2.5 wt. % of 1,2-propanediol as a surfactant, 0.5 wt. % of a silica based defoamer, 2.5 wt. % of a water dispersible boehmite with the remainder being water was prepared. In this Comparative Example (C-1) no theta-phase alumina was present (see FIG. 2).

In comparative example C-2, a water-based formulation consisting of 20 wt. % abrasive particles comprising a mixture of crystallized alpha-phase alumina and theta phase alumina, 2 wt. % aluminum nitrate, 2.5 wt. % of a surfactant (1,2-propanediol), 0.5 wt. % of a silica-based defoamer, and 2.5 wt. % of a water-dispersible boehmite with the remainder being water was prepared. In this formulation, the alpha/theta phase alumina abrasive particles comprised about 35 wt. % theta-phase alumina and about 65 wt. % alpha-phase alumina (see FIG. 1). These abrasive particles exhibited an average surface are of about 24 $m^2/g$.

In comparative example C-3, a water-based formulation comprising 20 wt. % uncrystallized alpha alumina abrasive particles, 2 wt. % aluminum nitrate, 2 wt. % of a surfactant (KXP-228, Lubrizol Corp., Westlake, Ohio), 1 wt. % of a silica-based defoamer, and 1.5 wt. % of a water dispersible Boehmite with the remainder being water was prepared. In this Comparative Example (C-1) no theta-phase alumina was present (see FIG. 2).

Testing of Experimental Runs and Comparative Examples—The viscosity and abrasive properties (e.g., removal rate) exhibited by each polishing formulation is summarized in Table 1 below. Comparative formulation C-1 exhibited a viscosity>300 cP, with 20-35 wt. % solids, and a removal rate of around 6 mg/min when tested on a conventional lens polisher. Comparative formulation C-2 exhibited a viscosity>300 cP, with 20-35 wt. % solids, and a removal rate of around 9 mg/min. Comparative formulation C-3 exhibited a viscosity<20 cP, with 20-35 wt. % solids and a removal rate of around 7 mg/min. In comparison, Experimental sample R-1 exhibited a viscosity of <20 cP, with 20-35 wt. % solids, and a removal rate of over 9 mg/min. Similarly, Experimental sample R-2 also exhibited a viscosity of <20 cP, with 20-35 wt. % solids, and a removal rate of over 10 mg/min.

TABLE 1

| Example | Removal Rate (mg/min) | Viscosity (cp) | Alumina Phase | Surfactant |
|---|---|---|---|---|
| C-1 | 6 | >300 | Uncrystallized Alpha | 1,2-PPD |
| C-2 | 9 | >300 | Crystallized Alpha/Theta | 1,2-PPD |
| C-3 | 7 | <20 | Uncrystallized Alpha | KXP-228 |
| R-1 | 9 | <20 | Crystallized Alpha/Theta | KXP-228 |
| R-2 | 10 | <20 | Crystallized Alpha/Theta | KXP-228 |

Comparative Examples C-1, C-2, and C-3 demonstrate formulations that do not include a crystallized alpha/theta phase (see C-1, C-3) or have a viscosity that is less than 25 centipoise (see C-1, C-2). Thus, these Comparative Examples provide a removal rate that is less than 8 mg/min and/or a viscosity that is too high to provide the necessary polishing of the polycarbonate lens. In comparison, Experimental Runs R-1 and R-2 demonstrate formulations prepared according to the teachings of the present disclosure with a mixture of crystallized alpha alumina and theta alumina as the abrasive particles and a surfactant or dispersant that lowers the viscosity to less than 25 centipoise (cP). The Experimental Runs (R-1, R-2) provide both the low viscosity and a removal rate in excess of 8 mg/min that is necessary to effectively polish a plastic lens.

The conventional lens polisher used in these examples was a Satisloh Toro-X-2S system and various uncut plastic ophthalmic lenses, such as GENTEX Optics CR39 lenses. Viscosity was measured with a Brookfield DV1 Viscometer and pH was measured using a Mettler Toledo SevenCompact PH meter. Surface Area was determined using BET methods on a Micromeretics TriStar II unit. The x-ray diffraction pattern for phase determination was measured using a Rigaku MiniFlex II desktop x-ray diffractometer. Particle size reduction of the alumina abrasive grains was performed by milling in an EMI Horizontal Bead Mill. Particle size distribution data was measured by light scattering methods on a Horiba LA930 particle size analyzer.

The conditions used for running the Toro-X-2S are to keep piston pressure at 0.5 bar and the flowrate for the polish high enough to keep the surface of the lens coated at all times during the run, for the Toro-X-2S this is roughly a 5 L/min total flow rate. The run would last for 6 minutes with the lens being cleaned with water and gently dried using a clean microfiber cloth both before and after the run. The lens was weighed after cleaning before and after being subjected to polishing on a Mettler Toledo New Classic MS scale with the mass being recorded. The change in mass from before and after polishing is then divided by the number of minutes the lens was subjected to polishing to determine the mass/time removal rate. This process is repeated at least 5 times to get an average for each polishing formulation to ensure consistent and accurate results.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A formulation comprising an aqueous dispersion of abrasive particles and a surfactant configured to polish an external surface of a plastic ophthalmic lens;

wherein the polishing formulation has a viscosity of about 1 cP to about 25 cP with a total solids content in the range of about 15 wt. % to about 40 wt. %;

wherein the abrasive particles comprise a mixture of crystallized alpha alumina and theta alumina; the alpha alumina being present in an amount ranging from 50 wt. % to 80 wt. % and the theta alumina being present in an amount ranging from 50 wt. % to 20 wt. % relative to the overall weight of the abrasive particles.

2. The formulation according to claim 1, further comprising one or more of a water dispersible Boehmite, a defoamer, aluminum nitrate, and a rinsing aid.

3. The formulation according to claim 1, wherein one or more of the following is present:

the abrasive particles have a surface area in the range of about 10 $m^2/g$ to about 35 $m^2/g$;

the abrasive particles have an average particle size ($D_{50}$) in the range of about 1 micrometer (um) to about 5 μm; and the abrasive particles are present in a concentration ranging from about 15 wt. % to about 30 wt. % relative to the overall weight of the formulation.

4. The formulation according to claim 1, wherein the formulation has pH that is between about 3 to about 5.

5. The formulation according to claim 1, wherein the surfactant comprises a carboxy-functionalized or carboxylated polymer or copolymer.

6. The formulation according to claim 1, wherein the amount of alpha alumina ranges from about 60 wt. % to about 70 wt. % and the amount of theta alumina ranges from about 40 wt. % to about 30 wt. % relative to the overall weight of the abrasive particles.

7. The formulation according to claim 2, wherein one or more of the following is present:

the Boehmite has an average particle size ($D_{50}$) that is less than about 0.5 μm and is present in an amount up to 10 wt. % relative to the overall weight of the formulation; and the defoamer is a water-soluble silica based defoamer present in a concentration that ranges up to 1 wt. % relative to the overall weight of the formulation.

8. The formulation according to claim 1, wherein the viscosity of the of the formulation is in the range from about 1 cP to about 10 cP.

9. The formulation according to claim 1, wherein the formulation provides a removal rate of at least 8 mg/min when measured in a conventional lens polisher with an uncut plastic ophthalmic lens.

10. The formulation according to claim 1, wherein the plastic ophthalmic lens comprises polycarbonate.

11. The formulation according to claim 1, wherein the abrasive particles further comprise <1 wt. % of a gamma-phase alumina or delta-phase alumina.

12. A method of polishing an external surface of a plastic ophthalmic lens, the method comprising the steps of:

providing a plurality of abrasive particles comprising a mixture of crystallized alpha alumina and theta alumina having an average particle size ($D_{50}$) in the range of about 1 micrometer (μm) to about 5 μm; the alpha alumina being present in an amount ranging from 50 wt. % to 80 wt. % and the theta alumina being present in an amount ranging from 50 wt. % to 20 wt. % relative to the overall weight of the abrasive particles;

preparing a formulation comprising an aqueous dispersion of the abrasive particles and a surfactant; wherein the polishing formulation has a viscosity of about 1 cP to about 25 cP with a total solids content in the range of about 15 wt. % to about 40 wt. %;

applying the formulation to the external surface of the plastic ophthalmic lens;

mechanically rubbing the formulation across the external surface of the plastic ophthalmic lens to remove a layer of plastic material from the external surface; and removing the formulation from the external surface to obtain a polished surface.

13. The method according to claim 12, wherein the abrasive particles are present in the formulation at a concentration ranging from about 15 wt. % to about 30 wt. % relative to the overall weight of the formulation;

wherein the amount of alpha alumina ranges from about 60 wt. % to about 70 wt. % and the amount of theta alumina ranges from about 40 wt. % to about 30 wt. % relative to the overall weight of the abrasive particles;

wherein the formulation is configured to remove plastic material at a rate of at least 8 mg/min when measured in a conventional lens polisher with an uncut polycarbonate ophthalmic lens.

14. The method according to claim 12, wherein providing a plurality of abrasive particles comprises the steps of:

preparing an aqueous mixture comprising 5 wt. % to 30 wt. % uncrystallized Boehmite and 0.5 wt. % to 4 wt. % nitric acid relative to the overall weight of the mixture;

placing the aqueous mixture into a sealed reaction vessel;

heating the sealed reaction vessel to a temperature ranging from 120° C. to 200° C. for a period of 4 hours to 24 hours to form a slurry;

collecting and drying the slurry to obtain a powder; and calcining the powder at a temperature ranging from 1,000° C. to 1,200° C. for a period of about 1 hour to about 20 hours to form the mixture of crystallized alpha alumina and theta alumina.

15. The method according to claim 14, wherein the mixture of crystallized alpha alumina and theta alumina is further subjected to particle size reduction using a milling operation.

16. The method according to claim 12, wherein the abrasive particles further comprise <1 wt. % of a gamma phase alumina or delta phase alumina.

17. The method according to claim 12, wherein the plastic ophthalmic lens comprises polycarbonate.

18. The method according to claim 12, wherein the formulation further comprises one or more of a water dispersible Boehmite, a defoamer, aluminum nitrate, and a rinsing aid.

19. The method according to claim 18, wherein when present, the Boehmite has an average particle size ($D_{50}$) that is less than about 0.5 μm and is present in an amount up to 10 wt. % relative to the overall weight of the formulation; wherein when present, the defoamer is a water-soluble silica-based defoamer present in a concentration that ranges up to 1 wt. % relative to the overall weight of the formulation.

20. The method according to claim 12, wherein the mechanical rubbing of the formulation across the external surface of the plastic ophthalmic lens is accomplished through the use of conventional mechanical or manual polishing equipment, a digital polisher, or polishing by hand.

* * * * *